United States Patent [19]

Meyn et al.

[11] Patent Number: 5,132,168
[45] Date of Patent: Jul. 21, 1992

[54] LIGHTNING STRIKE PROTECTION FOR COMPOSITE AIRCRAFT STRUCTURES

[75] Inventors: William A. Meyn, Del Mar; John Wilson, Bonita; Gerald A. Lunde, Norco; Melinda E. Huber-Lavalle, Riverside, all of Calif.

[73] Assignee: Rohr, Inc., Chula Vista, Calif.

[21] Appl. No.: 548,282

[22] Filed: Jul. 5, 1990

[51] Int. Cl.$^5$ .............................................. B32B 33/00
[52] U.S. Cl. ................................... 428/251; 428/286; 428/225; 428/290; 428/226; 428/229; 428/252; 428/257; 428/408; 428/902
[58] Field of Search ............... 428/286, 224, 225, 251; 361/117

[56] References Cited

U.S. PATENT DOCUMENTS 4,448,838  5/1984  McClenahan et al. ............. 428/251

Primary Examiner—George F. Lesmes
Assistant Examiner—Richard Weisberger
Attorney, Agent, or Firm—Patrick J. Schlesinger; Frank D. Gilliam

[57] ABSTRACT

A composite structure for aircraft having features making it resistant to structural damage when subjected to lightning strikes. Fiber tow is wound over a rotating shaping surface which is a surface of revolution. Spaced bands of tow are laid down in a helical pattern with varying spaces between bands. Some bands are typically wound at an angle of about +45°. By selectively winding in one direction and then the other, a "basketweave" pattern is obtained. Typically, the tow consists of high strength fibers in a thermosetting or thermoplastic resin matrix wound to a four layer thickness. When cured, the structure has high strength and low weight and is excellent for structures such as aircraft engine cowls. The basketweave pattern gives excellent resistance to peeling and delamination upon being struck by lightning, the types of damage which are likely to occur with the usual hoop or other continuous windings. The resistance to lightning strikes is further increased by winding one or more conductive filaments in a helical pattern, under tension, over the structure before the resin is cured. The conductive filaments serve to dissipate lightning energy over a large area and carry the charges away rapidly without being subject to peeling or separation from the composite structure surface.

7 Claims, 2 Drawing Sheets

LIGHTNING STRIKE PROTECTION FOR COMPOSITE AIRCRAFT STRUCTURES

BACKGROUND OF THE INVENTION

This invention relates in general to methods and fiber reinforced resin matrix aircraft structures and, more particularly, to methods and structures for protecting such structures from damage due to lightning strikes.

In recent years, composite materials made up of graphite or other high strength fibers embedded in a resin matrix have come into increasing use in aircraft. The very high strength-to-weight-ratios and high stiffness of these composites make them superior to metal structures for aircraft structures such as engine cowls. However, these materials have low conductivity making them susceptible to damage due to lightning strikes. Fiber layers may shatter, delaminate or peel when struck by lightning, causing a serious loss of structural integrity.

Many different schemes have been devised to increase the surface conductivity of composite materials to rapidly dissipate the energy of a localized lightning strike to prevent local damage. Problems remain, however, since these conductive surface materials tend to be heavy, reducing the weight advantage of the composites over metal structures, difficult to apply to complex curved surfaces, prone to peeling corrosion or other degradation in use and not fully protective against lightning strikes.

Typical of the prior lightning protection methods if that proposed in Propp's U.S. Pat. No. 4,186,237. There, a coating is applied to the low-conductivity aircraft surface which release a cloud of ions when exposed to an immediately pre-lightning strike electrical field. Typically, the coating consists of a metal layer covered with a layer of subliming metal salts in a lacquer coating. While somewhat helpful, the coating is complex, difficult to apply to curved surfaces and adds undesirable weight.

In U.S. Pat. No. 4,448,838, McClenahan discloses a lightning strike protection method in which metal fibers are woven in both the warp and fill directions in a woven graphite fiber sheet. The metal fibers are closer to the outer surface in some areas than others, diverting the lightning to those areas, causing a number of separate strikes so that instead of one heavily damaged area there are a number of less damaged areas. Because of the relatively wide spacing of the "small" strikes, significant damage may still occur. This method requires a 90° or similar weave, requiring timeconsuming and expensive hand lay-up of the conductive fibers in manufacturing the aircraft structure.

At least partially conductive surface layers or coatings have also been disclosed by King in U.S. Pat. No. 4,429,341 (surface coating of metal powder in a binder), Sanders in U.S. Pat. No. 4,349,859 (metallic tin surface coating), Paszowski in U.S. Pat. No. 3,755,713 (metal mesh embedded in surface coating) and Brick in U.S. Pat. No. 4,445,161 (metal particles embedded in an adhesive tape.) While each of these gives some degree of protection against lightning strikes, all are slow and difficult to apply and add undesirable weight. Satisfactory adhesion to the underlying composite is difficult to obtain. The added surface layers are subject to peeling, rain erosion and corrosion.

While many prior aircraft components, such as couling and nacelles, have in the past been fabricated from sheet metal and have little, if any, problem with lightning, those materials are going out of favor due to the relatively low strength, greater thickness, greater weight and difficulty of fabricating complex surface of rotation shapes from metal when compared to advanced fiber reinforced resin matrix materials. While it is possible to form surface of rotation shapes form metal filaments or strips in a resin matrix, as described, for example, by Eldred in U.S. Pat. No. 3,189,510, those structures are excessively heavy for aircraft purposes, generally inferior to sheet aluminum. Eldred teaches the use of metal wire wrapped structures for high strength applications, such as pressure vessels, with no suggestion that such structures could be used in applications, such as aircraft, in which light weight is essential.

Thus, there remains a need for improved means for protecting low conductivity composite aircraft structures against lightning strikes which overcomes the above noted problems. The protective system needs to be capable of simple and rapid application to curved surfaces, such as surfaces of revolution, to be variable in response to varying degrees of protection required, to resist peeling, erosion and corrosion and to not excessively increase the weight of the structure.

SUMMARY OF THE INVENTION

This invention applies to aircraft structures, such as engine cowls or housings which are surfaces of revolution. The structure is formed by filament winding the structure with high strength fiber prepreg tow in a manner producing a "basketweave" appearance with a series of bands at angles of about 30° to 60° to the winding axis. Typically, the structure is formed from four layers of the composite tow. We have found that this basketweave pattern improves resistance to severe structural damage from lightning strikes to a surprisingly large extent when compared to the usual "hoop" filament winding where a significant portion of fibers are wound at about 90° to the axis of revolution on the outer surfaces.

The lightning strike damage resistance of this structure is further improved by filament winding a conductive strand, such as either a fine metal wire or a metal coated graphite fiber, along the outer surface of the structure. The conductive strand is separately wound over the structure surface as an essentially single helical strand. The front is held in place by the prepreg matrix resin as it is cured and hardened. The conductive strand is wound with sufficient tension so that it effectively embedded in the surface and is unitary with the structure and not susceptible to peeling or delamination as a totally separate surface coating or plural, crossing, windings or a mesh or fabric of conductive strands would be.

BRIEF DESCRIPTION OF THE DRAWINGS

Details of the invention, and of certain preferred embodiments thereof, will be further understood upon reference to the drawing, wherein.

DETAILED DESCRIPTION OF THE INVENTION

Figure 1:
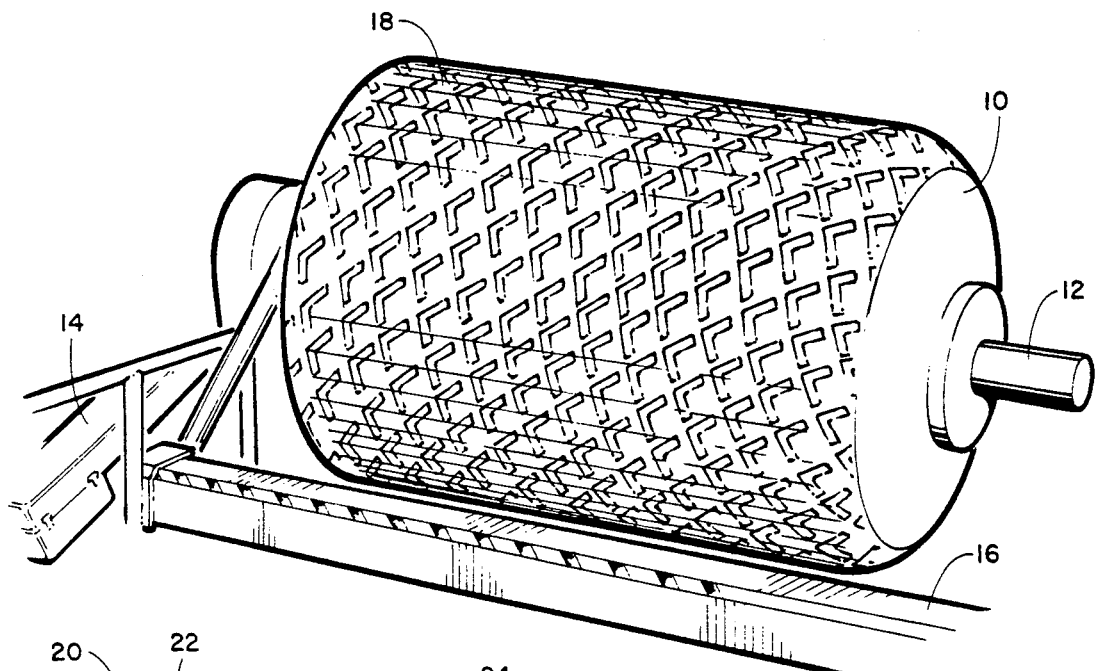
FIG. 1 is a perspective view showing a structure being wound, illustrating the basketweave winding.

Referring now to FIG. 1, there is seen a large machine for rotating a forming surface 10 (which is a surface of revolution) about an axis 12. As the forming surface 10 is rotated, a feed mechanism schematically indicated at 14 is moved along a bar 16 which is parallel to axis 12. A band or tow of fiber reinforced resin prepreg is fed from feed mechanism 14 onto surface 10 and the speed of movement of feed mechanisms 14 along bar 16, the tow may be laid onto surface 10 with the fibers nearly 90° to axis 12 (slow movement of feed mechanism 14) to any selected angle with more rapid movement of feed mechanism 14.

If tow is fed as feed mechanism 14 moves in both directions, and the speed of feed mechanism movement is sufficiently rapid that succeeding bands are spaced, the bands will be interweaved in a "basketweave" effect as seen across the surface of the final assembly 18 in FIG. 1. If desired, tow may be fed during feed mechanism movement in one direction only, to produce a plurality of layers of parallel bands. We have found, however, that the basketweave pattern is critical to obtaining satisfactory resistance to lightning strikes. When lightning, typically at a level of 100 kiloamperes or greater, strikes entirely parallel wound tow, either at a single angle or at 90° to the axis (so-called "hoop" windings) severe peeling and delamination of the tow results. With the basketweave winding, especially at our preferred +45° and −45° winding angles, much less severe damage occurs and structural integrity of the object is retained. Any suitable winding helix angles may be used with one half of the bands being in the +30° to −60° range, all relative to the winding axis. Winding directions will be altered periodically, as will the band spacings, to produce the required basketweave pattern.

A typical fiber winding machine which can be used to produce large objects such as jet engine cowls (e.g., nose cowl outer barrels for Pratt & Whitney JT9D-7R4 engines) is the McClean Anderson, 4 axis, computer controlled winding machine. Filament winding produces a structurally sound assembly with several advantages over hand lay-up, including lower cost, reduced manufacturing time, increased repeatability and a less labor intensive operation and enables the production of our basketweave pattern.

Any suitable prepreg material may be used. Typically, 6 or 12K graphite fibers impregnated with an epoxy resin may be used, such as Dexter-Hysol EA9101 resin, which is a solid at room temperature but has a viscosity of 2000 cps at 185° F. Another typical prepreg material is available under the 3501 AS5 designation from Hercules. Any other suitable high strength fibers may be used in any appropriate resin. Typical fibers include graphite, glass, boron and aramid fibers or mixtures thereof.

While the basketweave arrangement of tow bands helps prevent severe damage from most lightning strikes, greater protection is obtained by including a helical conductive strand on the outer layer of the prepreg assembly.

Figure 2:
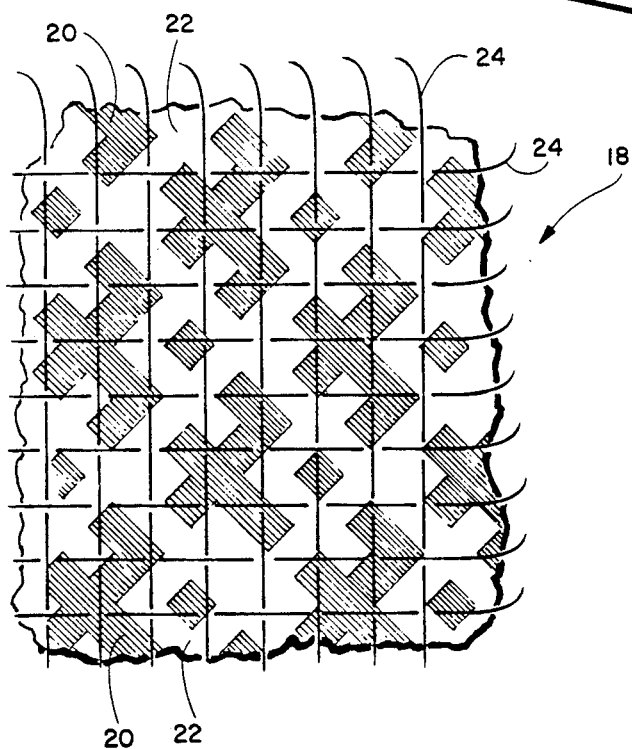
FIG. 2 is a detail perspective view showing an area of a composite surface having a separately wound conductive strand.
Figure 3:
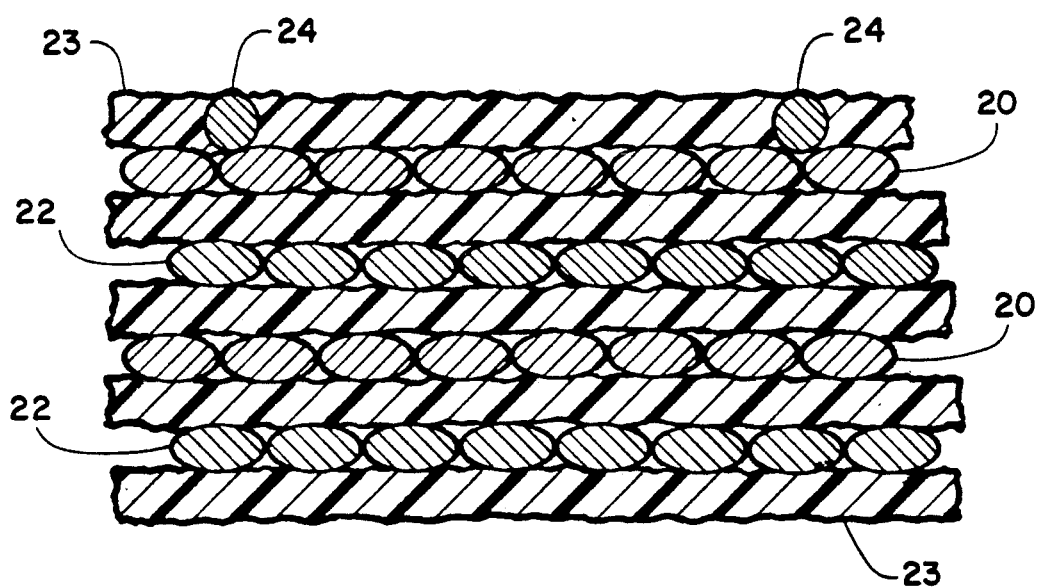
FIG. 3 is a vertical section view through the composite surface taken perpendicular to the surface in FIG. 7.

A small detail of the surface of an assembly 18 such as is seen in FIG. 1 is illustrated in FIGS. 2 and 3. Bands of a first tow pattern 20 are laid over a second tow pattern or direction 22 to produce the basketweave effect. After all of the tow has been applied, but before the prepreg resin is fully cured, conductive filaments or wire 24 are wrapped in a helical pattern as shown. Any suitable metal wires or metal coated fibers may be used. For best results, we prefer nickel wires or nickel coated fibers, which could be the same fibers as used in the tow with a thin nickel coating. The conductive filaments 24 serve to spread the energy from a lightning strike over a large surface. Since the filaments are relatively closely spaced, the energy entering any wire at any location will not be great because of the multiple entry points.

Any suitable conductive filament diameter and interfilament spacings may be used. Typically, filaments having diameters from about 0.001 to 0.01 inch may be used with about 0.1 to about 0.25 inch between adjacent, substantially parallel helical windings. For optimum results, we prefer to use nickel wires having diameters of about 0.004 inch or graphite filaments with a nickel surface coating of about 0.5 microns thick, with the substantially parallel filaments 24 spaced about 0.125 inch apart. Since the wires will be tautly wound over the assembly surface, they will slightly embed themselves into the prepreg resin and be securely bonded to the assembly when the prepreg is fully cured, as seen in FIG. 3.

The detailed section view of FIG. 3 schematically illustrates the tow layers 22 somewhat exaggerated in thickness, with the prepreg resin layers relatively thicker for clarity. As seen, the first and third layers of tow 20 angle to the right and the second and fourth layers 22 angle to the right forming a portion of the basketweave pattern. The prepreg resin 23 impregnates and coats the surfaces of tow 20 and 22. Filaments 24 are wound with sufficient tension to become embedded in resin 23 and contact tow 20. While the filaments 24 will be well bonded to the structure by resin 23, in most cases the structure will be coated with a layer of conventional aircraft paint prior to use, which will further hold filaments 24 in place.

For convenience of winding and best protection, a helical winding at approximately 90%° to the axis of rotation is preferred. The filament windings could be angled up to about 20° from 90° if desired, although there is ordinarily no advantage in so angling the windings. The windings should be done under some tension to assure close contact of the windings to the composite layers and to cause the wires to become embedded in the outer resin layer. The amount of tension will be selected empirically by examining test windings, since the optimum tension will vary with type and quantity of resin used in the prepreg, degree of prepreg polymerization, structure thickness, etc.

While a single long metal filament or metal coated filament is preferred for ease of winding, two or more spaced filaments could be simultaneously wound to speed up winding.

When our structure is struck by lightning, damage will be limited both the wires dividing and carrying away energy and the resistance of the basketweave arrangement to widespread delamination. Delamination of a particular area of the surface will ordinarily end where the particular area of the surface will ordinarily end where the particular struck and damaged tow passes under adjacent cross windings. We have found that more conductors on the surface than the single spaced helical winding are unnecessary to assure sufficient lightning protection when used in conjunction with the described basketweave winding of the nonconductive composite tow. Additional windings or crossed windings merely add undesirable weight to the structure.

In view of the foregoing, it is apparent that the use of a basketweave pattern in winding aircraft components which are surfaces of revolution in conjunction with a helically wound conductive filament produces a structure having exceptional resistance to lightning strikes. While certain preferred proportions and winding patterns are provided in the above description of preferred embodiments, those can be varied, where suitable, with similar results. For example, board thickness, band width, mandrel diameter, complexity of basketweave pattern, etc. may be varied for particular applications.

We claim:

1. A fiber reinforced resin composite for aircraft use which is resistant to damage from lightning strikes which comprises:
    a plurality of bands of high strength fiber tow impregnated with a resin, said bands lying on a surface of rotation;
    a first portion of said bands being spaced across said surface at an angle to the axis of rotation of from about −30 to +60;
    the balance of said bands being spaced across said surface at an angle to the axis of rotation of from about +30° to −60°, said bands being interweaved in a basket weave pattern;
    a metal or metal coated filament positioned on the outer surface of bands and at least partially embedded in the surface of said impregnating resin, said filament arranged in a substantially parallel helical coil, with adjacent turns of said coil spaced from about 0.1 to 0.25 inch apart; and
    said structure being at least about four band layers thick.

2. The structure according to claim 1 wherein said fibers are selected from the group consisting of graphite, glass, boron and aramid fibers and mixtures thereof and said resin is an epoxy resin.

3. The structure according to claim 1 wherein each of said bands has a width of about 1 to 3 inches.

4. The structure according to claim 1 wherein said filament lies at an angle to the winding axis of substantially 90°.

5. The structure according to claim 1 wherein the space between adjacent filament windings is about 0.125 inch.

6. The structure according to claim 1 wherein said filaments are selected from the group consisting of metal wires, metal coated fibers and mixtures thereof.

7. The structure according to claim 1 wherein said metal is nickel.

* * * * *